Dec. 28, 1965
L. C. DAVIDSON
3,225,859
PIPE LINE HYDROPHONE SYSTEM
Filed March 30, 1964
2 Sheets-Sheet 1
FIG. 1.
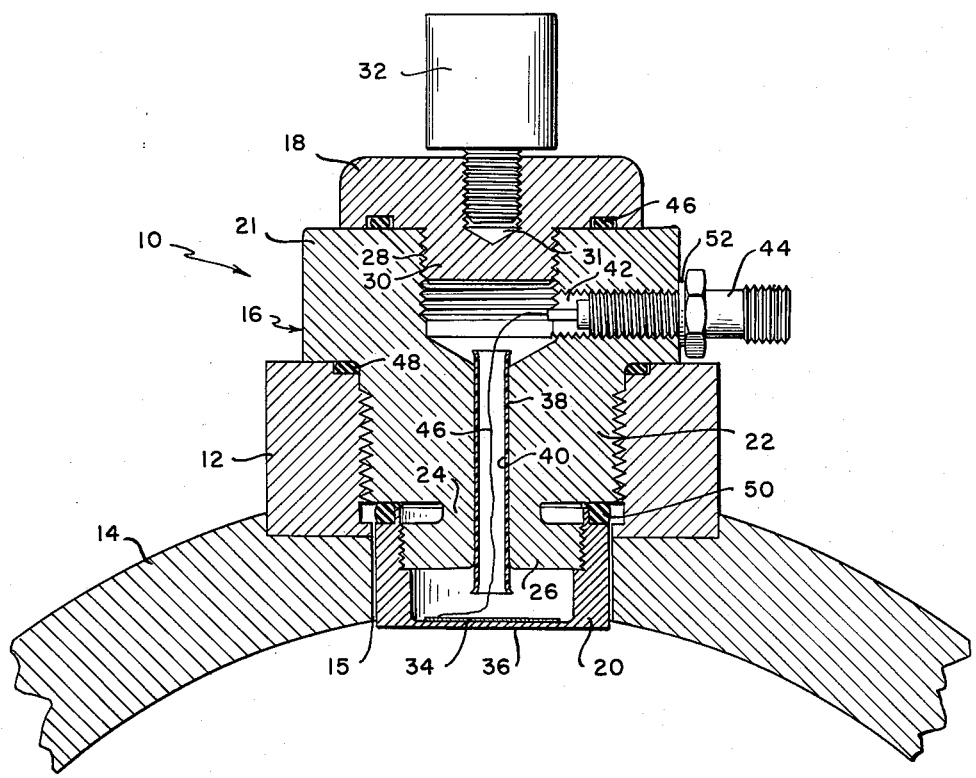
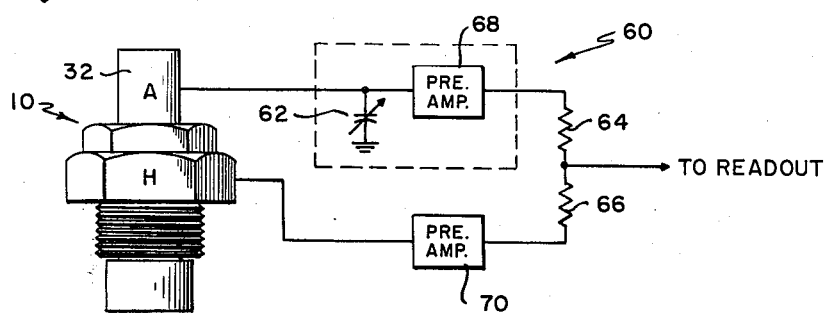
FIG. 3.
INVENTOR.
LAWRENCE C. DAVIDSON
BY
ATTY.

United States Patent Office 3,225,859
Patented Dec. 28, 1965

3,225,859
PIPE LINE HYDROPHONE SYSTEM
Lawrence C. Davidson, Annapolis, Md., assignor to the United States of America as represented by the Secretary of the Navy
Filed Mar. 30, 1964, Ser. No. 355,971
10 Claims. (Cl. 181—.5)

(Granted under Title 35, U.S. Code (1952), sec. 266)

The invention described herein may be manufactured and used by or for the Government of the United States of America for governmental purposes without the payment of any royalties thereon or therefor.

The present invention relates to transducers, and more specifically to a hydrophone mounted in a pipe wall for measuring longitudinal pressure disturbances (acoustic pressure) in a fluid contained by the pipe.

In a system where fluid is contained by a pipe, sound will travel through the system in the form of a longitudinal pressure disturbance in the fluid. In an effort to trace the sound back to its source, or to investigate the transmission of sound through the system generally, irrespective of its source, it is necessary to measure the longitudinal pressure disturbance, or acoustic pressure.

While various pressure sensitive hydrophones have been designed for measuring sound traveling through fluid transfer systems, non have proved entirely effective. The prior art hydrophones were generally of two types; one type extended into the fluid, and the other type was mounted substantially flush with the inner surface of the pipe wall. The hydrophones that extended into the fluid stream were deficient because they cerated fluid turbulence which complicated measurement of the acoustic pressure.

The hydrophones mounted flushly in the pipe wall were effective in reducing fluid turbulence, but still did not give accurate measurements of longitudinal pressure disturbances. The erroneous readings were attributable to the fact that the hydrophones were sensitive to pipe wall strain, and were highly and irregularly responsive to pipe wall acceleration and transverse pressure disturbances in the fluid caused by pipe wall vibration. Consequently, the measurements of longitudinal pressure disturbances by these hydrophones were mixed with the hydrophones' responses to pipe wall strain, pipe wall acceleration, and transverse pressure disturbances in the fluid, and were not, therefore, indicative of the true longitudinal pressure disturbances.

In view of the foregoing, it is an object of the present invention to overcome the deficiencies and difficulties associated with prior art hydrophones, by providing an improved hydrophone for measuring longitudinal pressure disturbances in a fluid contained by a pipe.

It is another object of the present invention to provide a hydrophone capable of measuring substantially only longitudinal pressure disturbances in a fluid contained by a pipe, under environmental conditions of pipe wall acceleration, pipe wall strain, and transverse pressure disturbances in the fluid.

It is still another object of the present invention to provide a transducer for measuring longitudinal pressure disturbances in a fluid moving through a pipe without causing turbulence in the fluid.

It is a further object of this invention to provide a pipe wall mounted transducer assembly capable of distinguishing responses due to the longitudinal pressure disturbance in a fluid in a pipe from responses due to pipe wall acceleration and transverse pressure disturbances in the fluid.

It is a still further object of this invention to provide a pipe wall mounted transducer which is substantially non-responsive to pipe wall strain.

The present invention attains the aforementioned objects by providing a hydrophone adapted to be mounted in an aperture in a pipe wall with its pressure sensitive surface extending flush with the inner surface of the pipe wall. The hydrophone is provided with means for seating an accelerometer thereon; and an electrical network is provided between the accelerometer and hydrophone for combining their signals.

Other objects and many of the attendant advantages of this invention will be readily appreciated as the same becomes better understood by reference to the following detailed description when considered in connection with the accompanying drawings wherein:

FIG. 1 is a front elevation view, partly in section, of a preferred embodiment of the hydrophone of this invention shown mounted in a pipe wall, and having an accelerometer seated thereon;

FIG. 3 schematically shows an electrical network connected between the accelerometer and hydrophone of FIG. 1 for balancing and combining the signals produced by each.

Figure 2:
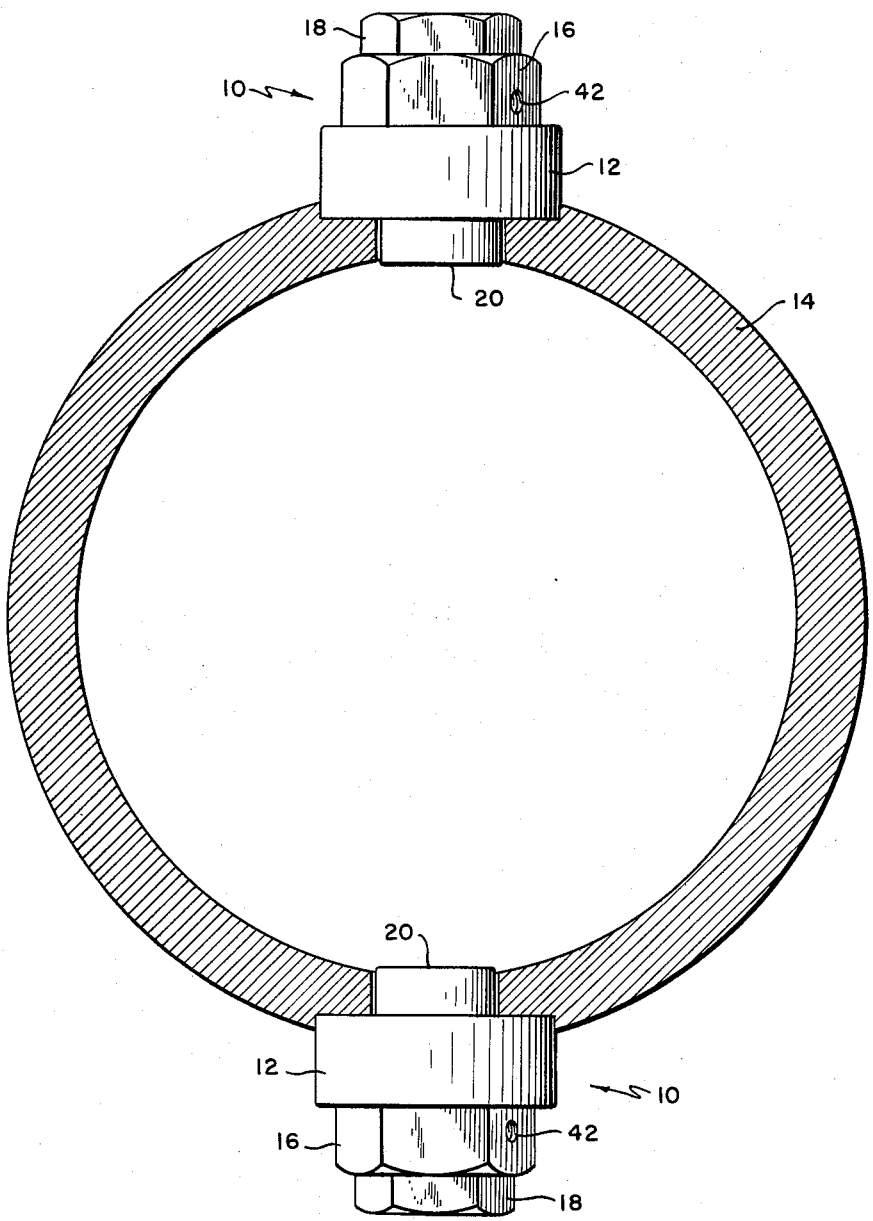
FIG. 2 is a front elevation view, partly in section, of two hydrophones of this invention mounted in diametrically opposed relationship in a section of pipe.

Referring now to the drawings wherein like reference characters designate like or corresponding parts throughout the several views, there is shown in FIG. 1 a hydrophone 10 secured in a mounting boss 12 in a pipe wall 14 with the sensitive axis of the hydrophone perpendicular to the longitudinal axis of the pipe. The pipe wall 14 has an aperture 15 therethrough into which one end of the hydrophone extends.

The hydrophone includes a body member 16, a cover member 18, and a transducer-carrying cup-shaped container member 20. The body member 16 has a head portion 21 on its end that extends radially outward from the pipe wall 14, a central portion 22, a reduced stem portion 24, and a pedestal portion 26 on its end which extends into the aperture 15 in the pipe wall.

An internally threaded bore 28 is disposed in the head portion 21 and receives the externally threaded stub 30 of cover member 18, to seat the cover member thereon. Cover member 18 has an internally threaded bore 31 in its upper surface for receiving the stub of an accelerometer 32 to seat the accelerometer on the hydrophone with the sensitive axis of the accelerometer in line with the sensitive axis of the hydrophone.

The central portion 22 of the body member 16 is threaded externally to cooperate with the internally threaded mounting boss 12 to secure the body member therein. The pedestal portion 26 is also threaded externally to retain the internally threaded container member 20 thereon.

The bottom of the container member 20 is a pressure sensitive diaphragm 36, the outer surface of which is the pressure sensitive surface of the hydrophone. A transducer element 34, shown herein as a laminated, bending-sensitive, piezoelectric ceramic wafer, is cemented directly to the inside surface of the diaphragm 36.

Extending longitudinally through the body member 16 is a channel 38, and disposed in the channel is an insulating sleeve 40. An internally threaded passage 42 extends through the head portion 21 of the body member 16 at an approximate right angle to the channel 38; and disposed in the passage 42 is an electrical connecter 44. An electrical wire 46 attached at one of its ends to the free side of the transducer element 34, extends through the insulating sleeve 40 in the channel 38, and is connected at its other end to the electrical connecter 44.

In order to prevent leakage of the fluid in the pipe 14 through the hydrophone, O-rings 46, 48 and 50 are provided respectively, between the cover member 18 and the body member 16, the mounting boss 12 and the body member, and the container member 20 and the body member. A washer 52 is disposed between the connector 44 and the body member. O-ring 50 serves the additional function of reducing any vibration which might occur in the cantilevered container member-pedestal assembly.

As can be seen in FIG. 1, the circumference of the container member 20 is slightly smaller than that of the peripheral wall of the aperture 15. The pedestal portion 26 of the body member 16 is connected to the central portion 22 by a reduced stem portion 24. Thus, the only connection between the diaphragm 36 and the pipe 14 is a path through the container member 20, the pedestal portion 26, the reduced stem portion 24, the central portion 22, and the mounting boss 12. Obviously, the diaphragm is substantially isolated from any stress or strain in the pipe wall 14.

The cover member 18, in addition to serving as a mounting surface for the accelerometer 32, provides access to the electrical connections in the body member to facilitate assembly or disassembly of the hydrophone.

In operation, the hydrophone 10 is secured in the mounting boss 12 so that the outer surface of the diaphragm 36 is substantially flush with the inner surface of the pipe wall 14. The accelerometer 32 is then mounted on the hydrophone 10 so that its sensitive axis is in line with the sensitive axis of the hydrophone.

As thus assembled, the diaphragm 36 and the ceramic 34 will be subjected to bending by: (1) longitudinal pressure disturbances (acoustic pressure) in the fluid; (2) pressure due to acceleration of the pipe and hydrophone itself; and (3) a pressure gradient in the fluid due to transverse vibration of the pipe. Thus, the voltage output of the hydrophone will consist of three signals:

$V_1$—proportional to acoustic pressure (desired signal);
$V_2$—proportional to the normal component of acceleration (along the sensitive axis of the hydrophone); and
$V_3$—proportional to the normal component of acceleration multiplied by the density of the fluid and the diameter of the pipe.

Signals $V_2$ and $V_3$ will be in phase, and may be treated as one signal.

The accelerometer 32, mounted on hydrophone will be subjected to the same components of acceleration as the hydrophone. Its output, therefore, will be proportional to $V_2$ and $V_3$, and 180 degrees out of phase therewith. Since $V_3$ is a function of the density of the fluid in the pipe and the diameter of the pipe, the amplitude of the accelerometer signal will ordinarily not be equal to that of $V_2$ and $V_3$, and $V_1$ may not yet be determined.

In order to render the accelerometer signal equal in amplitude to $V_2$ and $V_3$, so that $V_1$ may be determined, an external, step-balancing, electrical network 60 (see FIG. 3) is provided. Electrical network 60 includes a shunt capacitor 62 for matching the outputs of the hydrophone and accelerometer, and resistors 64 and 66 for adding their signals. Depending upon the relative sensitivities of the accelerometer and hydrophone, pre-amplifiers 68 and 70 may be needed to amplify the signals therefrom.

In FIG. 3, the shunt capacitor 62 and pre-amplifier 68 are shown as one self-contained unit.

With the voltage output of the accelerometer equal in amplitude to $V_2$ and $V_3$, and 180 degrees out of the phase therewith, it is apparent that the signal from the acoustic pressure in the fluid is all that will remain when the signals of the accelerometer and hydrophone are combined.

FIG. 2 shows an alternative assembly for measuring acoustic pressure in a fluid contained by a pipe. In lieu of using an accelerometer on the hydrophone 10 to phase cancel the unwanted signals, two hydrophones may be placed in diametrically opposed apertures in the pipe wall 14. Since their acceleration responses will be 180 degrees out of phase, and their responses to the transverse pressure disturbances in the fluid will be 180 degrees out of phase, these two signals will cancel, and the signals due to acoustic pressure in the fluid will add. This assembly will automatically compensate for pipe size and fluid density changes so that the external network of FIG. 3 would serve only to match the sensitivities of the two hydrophones and combine their signals. An accelerometer in this system would only be advantageous when acceleration measurements are desired.

As can be seen from the foregoing, an improved hydrophone is provided for measuring acoustic pressure of a fluid in a pipe. Obviously many modifications and variations of the invention are possible in the light of the above teachings. It is, therefore, to be understood, that within the scope of the appended claims, the invention may be practiced otherwise than as specifically described.

What is claimed is:

1. Apparatus for measuring accoustic pressure in a fluid contained by a pipe wall having an aperture therethrough comprising:
   a hydrophone having a pressure sensitive surface on one end thereof;
   means for mounting said hydrophone on the pipe wall with said pressure sensitive surface of said hydrophone disposed in the pipe aperture, flush with the inner surface of said pipe, and spaced from the peripheral wall of said aperture;
   said hydrophone including a body member comprising a central portion, a head portion on one end of said central portion, a pedestal portion on the other end of said central portion, and a reduced neck portion separating said central portion from said pedestal portion for strain isolating said pedestal portion from said central portion; and
   said hydrophone further including a transducer container secured on said pedestal portion of said body member.

2. Apparatus according to claim 1, wherein:
   said transducer container is cup-shaped; and
      the bottom of said cup-shaped container is a diaphragm having an inside surface facing the inside of said container, and an outside surface facing the opposite direction;
      the outside surface of the container being the said pressure sensitive surface of said hydrophone.

3. Apparatus according to claim 2, wherein a transducer element is secured to the said inside surface of said diaphragm.

4. Apparatus according to claim 3, wherein said transducer element is a bending-sensitive ceramic disc, and is secured to said diaphragm by a thin layer of cement.

5. Apparatus according to claim 4, wherein a channel extends through the central portion, reduced neck portion, and pedestal portion of said body member, through which an electric wire connected to said transducer element may pass.

6. Apparatus according to claim 5, wherein a cover member is secured to the head portion of said body member for providing a closure for the said channel in said body member.

7. Apparatus according to claim 6, wherein said cover member includes means for mounting an accelerometer thereon.

8. Apparatus according to claim 6, wherein an accelerometer is mounted on said cover member.

9. Apparatus according to claim 8, wherein an electrical network is connected between said hydrophone and said accelerometer for matching and combining the signals therefrom.

10. Apparatus according to claim 1, wherein said means for mounting said hydrophone on the pipe includes:
- a mounting boss having a hole therethrough adapted to be mounted on the outer surface of the pipe with its hole communicating with the aperture in the pipe wall; and means on said hydrophone for mounting said hydrophone in said mounting boss.

References Cited by the Examiner
UNITED STATES PATENTS

| | | | |
|---|---|---|---|
| 2,444,069 | 6/1948 | Sivian | 340—6 |
| 2,515,221 | 7/1950 | Henning | 73—194 XR |
| 3,158,831 | 11/1964 | Boyer | 340—5 |

LOUIS R. PRINCE, *Primary Examiner.*

DAVID SCHONBERG, *Examiner.*